United States Patent [19]
Croce

[11] 3,786,595
[45] Jan. 22, 1974

[54] DEVICE FOR RELEASABLY CONNECTING A SINKER TO A LINE

[76] Inventor: Nicola Croce, 7511 Leesburh Pl., Bethesda, Md.

[22] Filed: Oct. 17, 1972

[21] Appl. No.: 298,452

[52] U.S. Cl. .............................. 43/44.87, 43/44.91
[51] Int. Cl. ............................................. A01k 95/00
[58] Field of Search............. 43/44.87, 44.88, 44.91

[56] References Cited
UNITED STATES PATENTS
3,381,407  5/1968  McDougall .................... 43/44.88 X
3,589,052  6/1971  King................................. 43/44.88

*Primary Examiner*—Louis G. Mancene
*Assistant Examiner*—Daniel J. Leach
*Attorney, Agent, or Firm*—Leo A. Rosetta et al.

[57] ABSTRACT

A device for releasably connecting a sinker to a line comprising a body member having a bore therethrough and a lever means attached to the body member. The lever means has a line-engaging portion at one end and a sinker attaching means at the other end. The lever is moveable between an engaged position and a released position.

9 Claims, 6 Drawing Figures

PATENTED JAN 22 1974  3,786,595
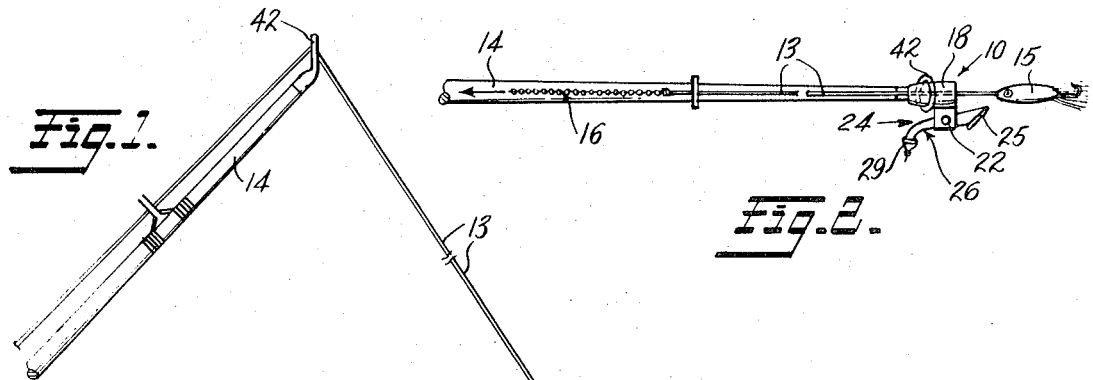
Fig.1.  Fig.2.
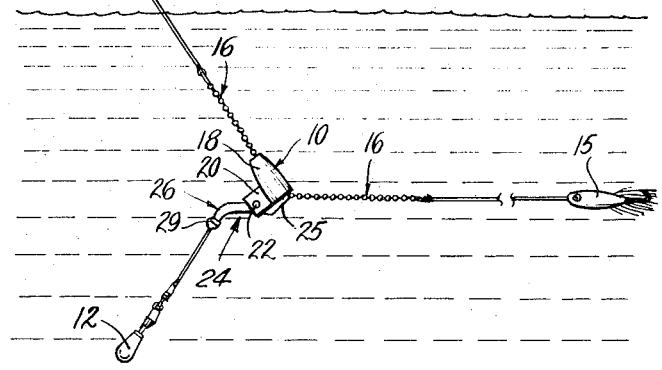
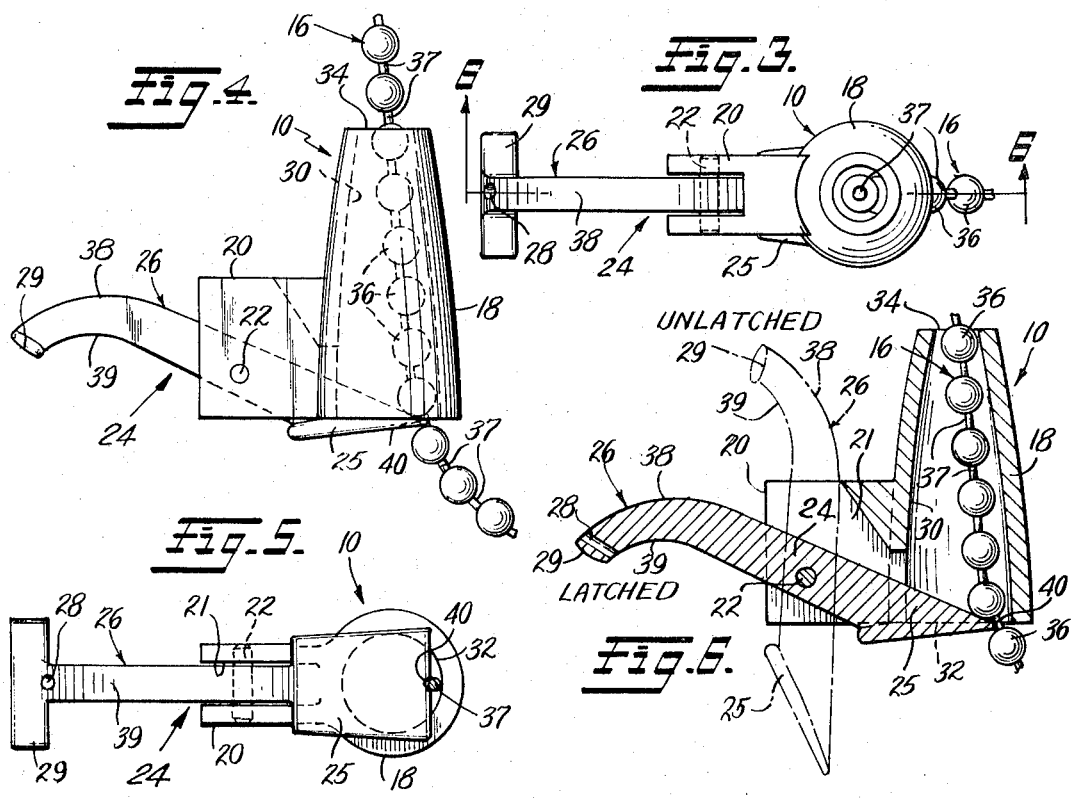
Fig.4.  Fig.3.
Fig.5.  Fig.6.

DEVICE FOR RELEASABLY CONNECTING A SINKER TO A LINE

BACKGROUND AND OBJECTS

1. Field of the Invention

This invention relates to devices for releasably connecting sinkers to fishing lines.

In the usual fixed sinker arrangement, the sinker is secured to the fishing line at a substantial distance from the lure or bait. This is particularly true in the case where a long leader is used, such as in deep water trolling. When the fishing line is reeled in for retrieval of a catch, the sinker will strike the tip of the pole or rod leaving a significant length of line or leader which can only be awkwardly retrieved by hand. To overcome this problem, many releasable sinker devices have previously been proposed, but none of the prior devices provide the simplicity and reliability of the present invention.

2. Description of the Prior Art

An example of a prior art sinker release apparatus is found in U.S. Pat. No. 3,659,372. This device includes a pair of concentric members having a spring detent therebetween. Relative movement between the concentric members operates the spring detent for engagement or disengagement with a swivel fitting in the fishing line. One inherent disadvantage of such a device is the heavy friction between the moving parts producing rapid wear and uncertain operation. Another disadvantage is the tendency of the spring to lose its resiliency after continued flexing, producing further unreliability. The present invention overcomes these disadvantages by providing a sinker release having a simple, weight-biased lever system which minimizes friction and wear and which does not require the use of a spring.

U.S. Pat. No. 3,589,052 discloses a sinker having a pivoting release lever and an integral cam engaging a bead chain in a fishing line. Here, the body of the connecting member itself acts as the sinker weight. No means for biasing the lever arm to the line engaging position is provided, so that retention of the lever in the line engaging position is uncertain. This results in a device subject to accidental release. Alternate embodiments, however, provide for a special lever locking mechanism, but this results in a more complex and expensive device.

In the present invention, the provision of means for attaching a sinker at the end of a release lever results in a reliable device wherein the release lever is firmly held in the line-engaging position until release is desired. Also, the fact that a conventional sinker is externally attached to the device of the present invention, rather than being a part of the body of the device as in the last mentioned patent, makes the sinker weight much more readily changeable.

U.S. Pat. No. 3,381,407 discloses a device wherein a weight-biased lever acts as a fishing line clamp. However, the device is a fishing float, and, as such, has almost the reverse function of a sinker. The device does not relate to sinker release mechanisms, and the weight attached to the lever does not serve the dual purpose of a sinker means and lever biasing means as in the present invention.

OBJECT OF THE INVENTION

It is an object of the present invention to provide a device for releasably connecting a sinker to a line, which device is simple and inexpensive in construction, positive acting, reliable in its operation and practical in use.

It is a further object of the invention to provide a sinker release device which minimizes friction between the moving parts thereof and which includes a means for biasing parts of the device into a line engaging position without the use of a resilient member.

It is a more particular object of the present invention to provide a sinker release device having a pivotable lever, one end of which engages a fishing line, the other end of which receives a weight so that the weight acts both as a sinker means and as biasing means for the lever.

A further object of the invention is the provision of a sinker release device having a line-engaging lever, which lever includes a handle portion extending outwardly from the body of the device when the lever is in a line engaging position, thereby facilitating manual release of the lever.

Another object of the present invention is the provision of a bead chain in the fishing line to effect positive engagement of the release device with the line at a plurality of positions, and further provision of a tapering bore through the body of the release device to facilitate movement of the bead chain through the body and to prevent binding of the chain therein.

A further object of the invention is the provision of a release device having an outer taper from one end of the device to the other, to facilitate positioning of said device at the tip guide of a fishing rod.

An additional object of the invention is the provision of a recess in the line engaging portion of the release lever, the recess cooperating with links between the bead members of the chain to effect a positive engagement.

These, as well as other objects, advantages and features of the invention will hereinafter become more fully apparent from the accompanying drawing illustrating a presently preferred embodiment, from the following detailed description of the drawing and from the appended claims.

SUMMARY OF THE INVENTION

The present invention provides advantages over sinker release devices of the prior art in that it is simple and inexpensive in its construction and is versatile and reliable in its operation. These results are achieved by providing a body member with a bore therethrough for receiving a fishing line. A lever is pivotably attached to the body member, one end of the lever engaging the fishing line. The other end of the lever includes a sinker attaching means thereon. By this arrangement, attachment of a sinker to the lever serves a dual purpose. First, the ordinary purpose of any sinker device, namely, weighting of the fishing line, is served. In addition, attaching the sinker also serves the purpose of biasing the release lever into a line engaging position. Thus the weight of the sinker effects a strong connection with the fishing line and maintains such a connection without the need of a separate biasing means. This in turn means a reduction of the number of necessary parts and results in simplicity and cost savings.

The fact that the sinker weight acts to bias the lever into the line engaging position also results in a very reliable apparatus. The use of a spring or the like to provide a line-engaging bias, subjects the apparatus to possible failure since the spring loses its resilient force with continued use. The present invention provides for a line engaging bias which is not subject to such wear or weakening.

In the present invention, the lever includes a handle extending outwardly from the body member of the device when the lever is in the engaged position. This, together with the curved profile of the handle, makes the lever readily accessible by hand when the body of the release mechanism reaches the tip of the rod during retrieval of the fishing line. Pivotal movement of the lever toward the body then releases the lever from engagement with the line. This desirable result in the positioning of the lever is obtained by locating the line engaging portion of the lever substantially directly opposite to the handle portion.

The device of the present invention includes a tapering bore in the body member which bore converges from a large lower aperture to a small upper aperture in the body. This arrangement facilitates passage of a bead chain segment of the fishing line through the body without binding. The bead chain helps to effect a positive connection with the lever.

The lever includes a recess in its line-engaging end, the recess cooperating with wire links between the beads of the chain. When the end of the lever is in engagement with the chain it completely covers the large, lower aperture, but uncovers the aperture when it is moved out of engagement with the chain.

BRIEF DESCRIPTION OF THE DRAWING

FIG. 1 is a fragmentary side elevational view showing the arrangement of the sinker release of the present invention;

FIG. 2 is a fragmentary plan view showing the position of the sinker release relative to the tip of a fishing pole and in the released position;

FIG. 3 is an enlarged plan view of the sinker release;

FIG. 4 is a side elevation of the sinker release of FIG. 3;

FIG. 5 is a bottom view; and

FIG. 6 is a vertical sectional view taken on the line 6—6 of FIG. 3.

DETAILED DESCRIPTION OF THE DRAWING

In the various views like numerals designate like or corresponding parts. As seen in FIG. 1, the releasable sinker connecting device is designated in its entirety by reference numeral 10, and the separate sinker weight attached thereto is designated by reference numeral 12. FIG. 1 shows use of the present invention in trolling with the connecting device 10 and sinker 12 being submerged. A fishing line 13 from rod 14 includes a lure or bait 15 at its submerged end. Included in the fishing line 13, and near the end thereof, is a bead chain 16 passing through the connecting device.

Referring now to FIG. 4, the connecting device 10 includes a body member 18 of generally elongated configuration and including a lever support member 20 extending radially outwardly with respect to the longitudinal axis of the body member. As best seen in FIG. 6, the lever support member 20 includes a cavity 21 therein. A pin 22, as best seen in FIGS. 3 and 5, extends across cavity 21 and is secured at both ends in the support member 20. Pin 22 acts a fulcrum for lever 24.

Lever 24 includes a line-engaging portion 25 extending between the fulcrum and one end of the lever. A handle portion 26 extends between the fulcrum and the other end of the lever. A sinker attaching means 28, in this case shown merely as a small bore through the lever, is located near the lever's outer extremity. An enlarged portion 29 is also located near the outer extremity of the lever for facilitating manual gripping of the lever.

The body portion 18 includes a line receiving bore 30 extending longitudinally therethrough and having a curvilinear taper. The bore 30 opens into a lower aperture 32 and an upper aperture 34, the lower aperture having a substantially larger diameter than that of the upper aperture. The taper of the bore converges from the large lower aperture 32 to the small upper aperture 34.

The aforementioned bead chain 16 disposed in the fishing line 13 includes a plurality of spherical beads 36 joined together by wire-like links 37. When the connecting device 10 is in use, the bead chain is disposed in the line receiving bore 30, passing entirely therethrough. The lever 24 engages the bead chain 16 to secure the connecting device 10 thereto. Pivotal movement of the lever away from engagement with the bead chain effects release of the connecting device.

In FIG. 6, solid lines indicate the latched or engaged position of the lever 24. In this position, the line engaging portion 25 substantially covers the lower aperture 32 (as best seen in FIG. 5) to positively secure the connecting device to the bead chain 16. As also seen in FIG. 6, the handle portion 26 extends generally radially outwardly from the body member 18 in the engaged position. This handle portion includes a curved section 38 having a concave surface 39 facing away from the upper aperture 34. The radially outward disposition of the handle portion 26 in the engaged position provides ready access thereto when release is desired.

The curved section 38 together with the enlarged portion 29 provides a secure and comfortable finger grip for operation of the lever.

The line engaging portion 25 of the lever includes a recess 40 near the extreme end of the lever. The recess 40 cooperates with wire links 37 between the beads 36 of the chain line 16 for effecting an even more positive engagement.

The phantom lines of FIG. 6 illustrate the disposition of the lever 24 in the released or unlatched position. Here the lever is disposed generally parallel to the longitudinal axis of the body member 18, and the line engaging portion 25 of the lever completely uncovers the large lower aperture 32.

The exterior of the body member 18 has a curvilinear tapered configuration. This exterior taper converges from that end of the body member wherein the large lower aperture 32 is disposed to that end wherein the small upper aperture 34 is disposed. This full length, single direction, exterior taper of the body member will permit guidance of the connecting device into a secure position at the rod tip upon retrieval of the line, while also permitting the provision of a large aperture 32 in one end of the device for easy passage of the bead chain 16 therethrough.

The operation of the device of the invention is as follows:

When the sinker 12 is joined to the sinker attaching means 28 of the lever 24, a rotational bias is exerted on the lever 24 tending to move the handle portion 26 downwardly while urging the line engaging portion 25 upwardly so as to bias the lever into the engaged position. In this position, the connecting device 10 becomes positively secured to the bead chain 16, as described above. The lever will be maintained in this line engaging position whenever the sinker is attached and the fishing line 13 and lure or bait 15 are extended from the rod 14 for use.

When the line is retrieved and the connecting device 10 reaches a tip guide 42 of the rod 14, the outer taper of the body member 18 will cause the connecting device 10 to be guidably positioned in the tip guide 42 and secured therein for easy reach, as shown in FIG. 2. With the connecting device in this position on the rod, the handle portion 26 of the lever is manually moved toward the body portion 18 to the unlatched or released position (also shown in FIG. 2) to disengage the bead chain allowing complete retrieval of the fishing line.

With the lever in the unlatched or released position, the bead chain 16 can pass freely through the bore 30. The taper of the bore in conjunction with the wide lower aperture 32 effects a smooth guidance of the bead chain 16 through the connecting device 10 without binding of the chain at the aperture or in the bore.

While throughout the above description words such as "upper," "lower," and the like have been used, it is to be understood that these terms are intended only to describe relative relationships and in no way are intended to be absolute. It will be understood that while one embodiment has been described specifically and in detail, the invention may be practiced by other embodiments without departing from the spirit and scope of the invention as defined in the appended claims.

What is claimed is:

1. A device for releasably connecting a sinker to a line comprising:
   a. a body member having a bore therethrough;
   b. a lever means attached to said body member, said lever means having a line engaging portion at one end and a sinker means coupled near the other end, said lever means being movable between an engaged position and a released position;
   c. said sinker means being separate from said body member and being of sufficient weight to effect complete submergence of the line and the connecting device while biasing said lever means into said engaged position.

2. A connecting device as defined in claim 1, wherein:
   a. said lever means also includes a handle portion to which said sinker means is attached,
   b. said body member includes a fulcrum means associated therewith, said handle portion and said line engaging portion being located directly opposite each other on either side of said fulcrum means, whereby pivotal movement of said handle portion toward said body portion effects movement of said lever into the released position.

3. A connecting device as defined in claim 1 wherein said bore opens into an upper aperture and a lower aperture in said body member, said lower aperture having a diameter larger than that of said upper aperture, said bore tapering convergently from said lower aperture to said upper aperture.

4. A connecting device as defined in claim 2, wherein said line engaging portion substantially covers said lower aperture when said lever means is in said engaged position and uncovers said lower aperture when said lever means is in said released position.

5. A connecting device as defined in claim 3, wherein said lever means includes a curved section between said fulcrum and said other end, said curved section having a concave surface facing away from said upper aperture.

6. A connecting device as defined in claim 3, wherein said body member includes a tapering external portion, converging from said lower aperture to said upper aperture.

7. A connecting device as defined in claim 1 including a chain means extending through said bore, said chain means including a plurality of beads connected together by links.

8. A connecting device as defined in claim 7, wherein said line engaging means includes a recess therein, said recess cooperating with one of said links when said lever is in said engaged position.

9. A connecting device as defined in claim 1, wherein said lever means includes an enlarged portion at said other end.

* * * * *